United States Patent
Yang et al.

(10) Patent No.: US 11,860,684 B2
(45) Date of Patent: Jan. 2, 2024

(54) FEW-SHOT NAMED-ENTITY RECOGNITION

(71) Applicant: ASAPP, INC., New York, NY (US)

(72) Inventors: Yi Yang, Long Island City, NY (US); Arzoo Katiyar, Ithaca, NY (US)

(73) Assignee: ASAPP, INC., New York, NY (US)

( * ) Notice: Subject to any disclaimer, the term of this patent is extended or adjusted under 35 U.S.C. 154(b) by 288 days.

(21) Appl. No.: 17/024,406

(22) Filed: Sep. 17, 2020

(65) Prior Publication Data
US 2021/0374347 A1 Dec. 2, 2021

Related U.S. Application Data

(60) Provisional application No. 63/032,839, filed on Jun. 1, 2020.

(51) Int. Cl.
| | |
|---|---|
| *G06F 40/295* | (2020.01) |
| *G06F 40/284* | (2020.01) |
| *G06N 3/04* | (2023.01) |
| *G06N 7/01* | (2023.01) |

(52) U.S. Cl.
CPC .......... *G06F 40/295* (2020.01); *G06F 40/284* (2020.01); *G06N 3/04* (2013.01); *G06N 7/01* (2023.01)

(58) Field of Classification Search
CPC .............................. G06F 40/295; G06F 40/284
See application file for complete search history.

(56) References Cited

U.S. PATENT DOCUMENTS

| | | | |
|---|---|---|---|
| 11,132,988 B1* | 9/2021 | Steedman Henderson | ................... G10L 15/22 |
| 2009/0249182 A1* | 10/2009 | Symington | ........... G06F 40/295 715/209 |
| 2019/0065460 A1* | 2/2019 | Xin | ......................... G06N 3/044 |
| 2019/0303727 A1* | 10/2019 | Foroughi | ............... G06N 20/00 |
| 2021/0149993 A1* | 5/2021 | Torres | .................... G06N 3/045 |

OTHER PUBLICATIONS

Lample, Guillaume, et al. "Neural architectures for named entity recognition." Lample, Guillaume, et al. "Neural architectures for named entity recognition." arXiv preprint arXiv:1603.01360 (2016) (Year: 2016).*

(Continued)

*Primary Examiner* — Bhavesh M Mehta
*Assistant Examiner* — Nandini Subramani
(74) *Attorney, Agent, or Firm* — GTC Law Group PC & Affiliates

(57) ABSTRACT

A first named entity recognition (NER) system may be adapted to create a second NER system that is able to recognize a new named entity using few-shot learning. The second NER system may process support tokens that provide one or more examples of the new named entity and may process input tokens that may contain the new named entity. The second NER system may use a classifier of the first NER system to compute support token embeddings from the support tokens and input token embeddings from the input tokens. The second NER system may then recognize the new named entity in the input tokens using abstract tag transition probabilities and/or distances between the support token embeddings and the input token embeddings.

17 Claims, 7 Drawing Sheets

(56) References Cited

OTHER PUBLICATIONS

Oriol Vinyals, et al. Matching networks for one shot learning. In Advances in Neural Information Processing Systems, pp. 3630-3638 (2016) (Year: 2016).*

Khandelwal, Urvashi, et al. "Generalization through memorization: Nearest neighbor language models." arXiv preprint arXiv: 1911.00172 (2019) (Year: 2019).*

Bao, Yujia, et al., "Few-shot text classification with distributional signatures", International Conference on Learning Representations, 2020, 24 pages.

Cherry, Colin et al., "Proceedings of the 2nd workshop on deep learning approaches for low-resource nlp (deeplo 2019)", Proceedings of the 2nd Workshop on Deep Learning Approaches for Low-Resource NLP, 2019, 14 Pages.

Derczynski, Leon, et al., "Results of the wnut2017 shared task on novel and emerging entity recognition", Proceedings of the 3rd Workshop on Noisy User-generated Text, 2017, 8 Pages.

Devlin, Jacob, et al., "Bert: Pre-training of deep bidirectional transformers for language understanding", Proceedings of the North American Chapter of the Association for Computational Linguistics (NAACL), 2019, 16 Pages.

Forney, G David, "The viterbi algorithm", Proceedings of the IEEE, vol. 61, No. 3, 1973, 11 Pages.

Fritzler, Alexander, et al., "Few-shot classification in named entity recognition task", Proceedings of the 34th ACM/SIGAPP Symposium on Applied Computing, 2019, 8 Pages.

Geng, Ruiying, et al., "Induction networks for few-shot text classification", Proceedings of Empirical Methods for Natural Language Processing (EMNLP), 2019, 10 Pages.

Gu, Jiatao, et al., "Meta-learning for lowresource neural machine translation", Proceedings of Empirical Methods for Natural Language Processing (EMNLP), 2018, 10 Pages.

Han, Xu, et al., "Fewrel: A large-scale supervised few-shot relation classification dataset with state-of-the-art evaluation", Proceedings of Empirical Methods for Natural Language Processing (EMNLP), 2018, 7 pages.

Hofer, Maximilian, et al., "Few-shot learning for named entity recognition in medical text", arXiv preprint arXiv:1811.05468, 2018, 10 Pages.

Hou, Yutai, et al., "Few-shot slot tagging with collapsed dependency transfer and label-enhanced task-adaptive projection network", Proceedings of the Association for Computational Linguistics (ACL), 2020, pp. 1381-1393.

Lafferty, John, et al., "Conditional random fields: Probabilistic models for segmenting and labeling sequence data", Proceedings of the International Conference on Machine Learning (ICML), 2021, 10 pages.

Maaten, Laurens Van Der, et al., "Visualizing data using t-sne", Journal of machine learning research, 2008, 27 Pages.

Sang, Erik F Tjong Kim, et al., "Introduction to the conll-2003 shared task: language independent named entity recognition", Proceedings of the seventh conference on Natural language learning at HLT-NAACL 2003—vol. 4, 2003, 6 Pages.

Snell, Jake, "Prototypical networks for few-shot learning", Neural Information Processing Systems (NIPS), 2017, 11 Pages.

Stubbs, Amber, et al., "Annotating longitudinal clinical narratives for de-identification: The 2014 i2b2/uthealth corpus", Journal of biomedical informatics, 2015, 10 Pages.

Wang, Xuan, et al., "Comprehensive named entity recognition on cord-19 with distant or weak supervision", arXiv preprint arXiv:2003.12218, 2020, 5 Pages.

Weischedel, Ralph, et al., "Ontonotes release 5.0 ldc2013t19", Linguistic Data Consortium, Philadelphia, PA, 2013, 2 Pages.

Yang, Jie, et al., "Design challenges and misconceptions in neural sequence labeling", Proceedings of the 27th International Conference on Computational Linguistics (COLING), 2018, 11 Pages.

Yu, Mo, et al., "Diverse few-shot text classification with multiple metrics", Proceedings of the North American Chapter of the Association for Computational Linguistics (NAACL), 2018, pp. 1206-1215.

* cited by examiner

Larry Bird was number 33 for the Boston Celtics

Fig. 3A $$\begin{bmatrix} Person \\ Organization \\ Location \\ Other \end{bmatrix} \begin{bmatrix} .9 \\ .0 \\ .1 \\ .0 \end{bmatrix} \begin{bmatrix} .7 \\ .1 \\ .1 \\ .1 \end{bmatrix} \begin{bmatrix} .1 \\ .1 \\ .1 \\ .7 \end{bmatrix} \begin{bmatrix} .0 \\ .1 \\ .0 \\ .9 \end{bmatrix} \begin{bmatrix} .0 \\ .1 \\ .1 \\ .8 \end{bmatrix} \begin{bmatrix} .0 \\ .3 \\ .7 \\ .0 \end{bmatrix} \begin{bmatrix} .1 \\ .9 \\ .0 \\ .0 \end{bmatrix}$$

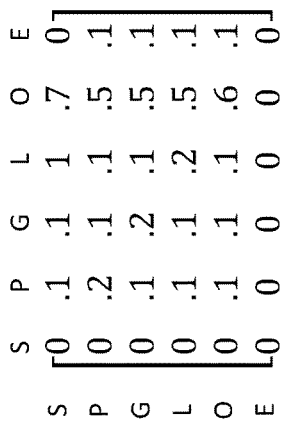

Fig. 3E

Larry Bird was number 33 for the Boston Celtics
Person                           Organization

Training Data: Michael Jordan was a basketball player for the Chicago Bulls in the state of Illinois.

Fig. 7

$$\begin{array}{c} \quad\; S \;\; I \;\; O \;\; IO \;\; E \\ \begin{array}{c} S \\ I \\ O \\ IO \\ E \end{array} \left[ \begin{array}{ccccc} 0 & .3 & .7 & 0 & 0 \\ 0 & .2 & .6 & .1 & .1 \\ 0 & .2 & .7 & 0 & .1 \\ 0 & .2 & .6 & .1 & .1 \\ 0 & 0 & 0 & 0 & 0 \end{array} \right] \end{array}$$

Fig. 8

FEW-SHOT NAMED-ENTITY RECOGNITION

CLAIM OF PRIORITY

This patent application claims the benefit of U.S. Patent Application Ser. No. 63/032,839, filed Jun. 1, 2020, and entitled "TRAINING-FREE FEW-SHOT NAMED ENTITY RECOGNITION WITH STRUCTURED NEAREST NEIGHBOR LEARNING" (ASAP-0032-P01).

The content of the foregoing application is hereby incorporated by reference in its entirety for all purposes.

BACKGROUND

Named-entity recognition (NER) techniques may be used to identify named-entities in text. A named-entity recognition system may be trained using a large corpus of training data. In some instances, a large corpus of training data may not be available or it may be desired to avoid the expense of obtaining a large corpus of training data. Existing techniques for creating a named-entity recognition system using a small corpus of training data may have poor performance. Accordingly, improved techniques are needed for creating a named-entity recognition system using a small corpus of training data.

BRIEF DESCRIPTION OF THE FIGURES

The invention and the following detailed description of certain embodiments thereof may be understood by reference to the following figures:

FIGS. 3A-E illustrate examples of processing that may be performed in implementing an NER system.

FIG. 7 illustrates abstract tag transitions in text.

FIG. 8 is an example abstract tag transition probability matrix.

DETAILED DESCRIPTION

In a variety of applications, it may be desired to extract information from text or another source of natural language. For clarity of presentation, text will be used as an example of natural language, but the techniques described herein may be applied to any form of natural language and are not limited to being applied directly to text.

One example of information extraction is the recognition of named entities. An entity is something that may be expressed or referenced in text, and a named entity is a group or collection of entities that are referred to using a common name. A named entity may refer to any kind of object (e.g., person, place, or thing), concept, or any other collection of entities that may be present in text. The following are non-limiting examples of named entities that may be using for applications of information extraction: person, profession, location, organization, company, number, percentage, date, time, monetary value, phone number, email, zip code, address, web address, URL, product, service, color, medical code, disease, diagnosis, doctor, patient, or customer.

A named-entity recognition (NER) system may process text and identify named entities that are present in the text. An NER system may include one or more mathematical models, such as neural networks, and an NER system may be trained using a corpus of training text. For example, it may be desired to create an NER system that is able to identify the named entities of person, organization, and location in text. To create such an NER system, a training corpus may be obtained that includes text where the person, organization, and location named entities have been labeled. An NER system may then be created by training the parameters of the mathematical models using the training corpus. For example, during training, a neural network may be used to distinguish words corresponding to the named entities from other words that do not correspond to the named entities.

Figure 1:
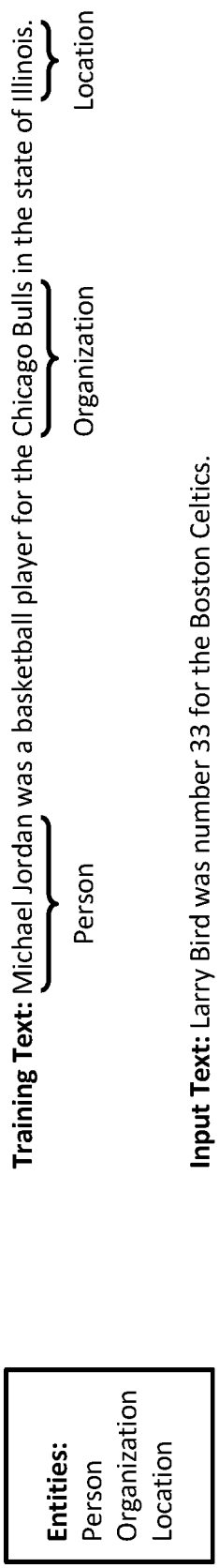
FIGS. 1-2 illustrate examples of named entities, training text, support text, and input text that may be used in implementing an NER system.

FIG. 1 is an example of named entities, training text, and input text for a first NER system. In FIG. 1, the first NER system recognizes the named entities of person, organization, and location. The first NER system may have been trained on a corpus of training data, such as the example training text shown in FIG. 1. The first NER system may have been trained on a large number of similar sentences, such as thousands or hundreds of thousands of similarly labeled sentences.

After the first NER system, has been created or trained, it may be used in production to recognize named entities in text that may be different from the text in the training corpus. For the example of FIG. 1, the input text in production may be the sentence "Larry Bird was number 33 for the Boston Celtics," and the first NER system may determine that "Larry Bird" corresponds to a person and that "Boston Celtics" corresponds to an organization.

The first NER system of FIG. 1, however, may not be able to recognize named entities other than person, organization, and location. To recognize a fourth named entity that is different from these three, some existing techniques may require obtaining a large corpus of training data with sufficient labeled examples of the fourth named entity and then training a new NER system using this additional training data.

In some instances, it may be desired to adapt an existing NER system to recognize a new named entity (one that it was not trained on) using a relatively small number of examples of the new named entity (referred to as support text) instead of going to the time and expense of generating a large training corpus. The process of creating an NER system using a relatively small number of examples of a new named entity may be referred to as few-shot learning.

Figure 2:
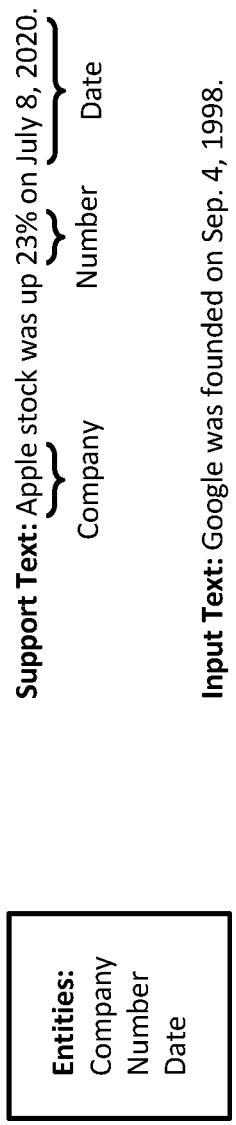

FIG. 2 is an example of named entities, support text, and input text, for a second NER system that may be created using few-shot learning and by adapting the first NER system of FIG. 1. In FIG. 2, the second NER system recognizes the named entities of company, number, and data. The second NER system may be created using support text that provides a few examples of each of the named entities. In some instances, one example of each named entity may be used and the process may be referred to as one-shot learning (one-shot learning is an example of few-shot learning).

FIG. 2 illustrates support text with named entities that may be used to create the second NER system. As described in greater detail below, the second NER system may compute an embedding vector for each word (or token) of the support text, compute an embedding vector for each word (or token) of input text from a production system, and then compute distances between the embedding vectors to determine the named entities that are present in the input text. For example, for the input text of FIG. 2, if the embedding vector for "Google" is closest to the embedding vector for "Apple," it may be determined that "Google" is a word that corresponds to a company entity.

Figure 4A:
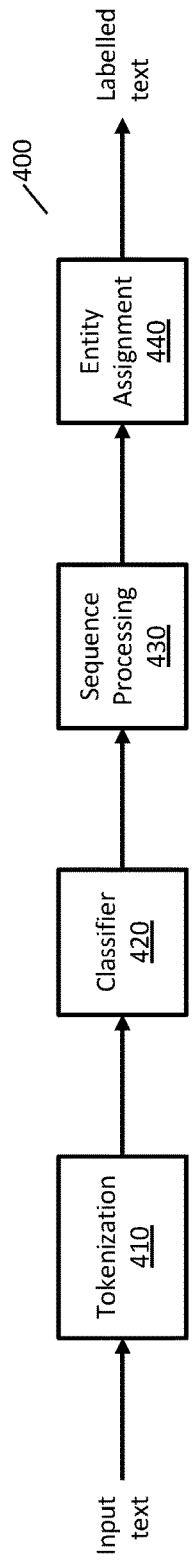
FIGS. 4A-B are examples of NER systems.

FIGS. 3A-E illustrate examples of processing that may be performed in implementing an NER system. FIG. 4A is an example NER system 400.

In FIG. 4A, NER system 400 receives input text for processing, such as the text of FIG. 3A. In FIG. 4A, tokenization component 410 processes the text to generate a sequence of tokens. Tokenization component 410 may implement any appropriate tokenization techniques, such as rules-based tokenization (e.g., splitting text on white space and applying rules to separate punctuation), byte-pair encoding, or word-piece encoding. For the purposes of illustration, each word of FIG. 3A may be represented as a token.

Classifier component 420 may then process the sequence of tokens and compute scores or probabilities for each token that the token corresponds to named entities. For example, where the NER system recognizes the entities of person, organization, and location, classifier component 420 may compute a vector of length 4 for each token where the vector includes 3 scores for the 3 named entities and a fourth score for "other" or not corresponding to any of the 3 named entities. FIG. 3B illustrates an example sequence of score vectors for the tokens of FIG. 3A.

Classifier component 420 may be implemented using any appropriate techniques. For example, classifier component 420 may be implemented using one or more neural networks, such as a long short-term memory neural network or a BERT (bidirectional encoder representations from transformers) neural network. In some implementations, a final layer of classifier component 420 may be an output layer, such as a linear layer and/or a softmax layer that outputs the vector of scores.

Sequence processing component 430 processes the sequence of score vectors and assign a tag to each token from a set of tags, where the set of tags corresponds to the named entities of the NER system plus an "other" tag for not matching any of the named entities. Sequence processing component 430 may output a sequence of tags, such as the tags of FIG. 3C.

Sequence processing component 430 may consider relationships between tokens in assigning a tag. For example, in FIG. 3B for the token "Boston," the named entity "Location" has the highest score. The token "Boston," however is assigned the tag "G" for "Organization" because the subsequent token "Celtics" has a high score for "Organization." Sequence processing component 430 may be implemented using any appropriate techniques, such as with a Viterbi decoder.

In some implementations, the possible tag set may also include additional information, such as whether the tag begins a named entity, is inside a named entity, ends a named entity, or is a complete or unitary named entity. For example, a BIO tagging scheme (beginning, inside, outside) or a BILOU tagging scheme (beginning, inside, last, outside, unit) may be used.

In some implementations, sequence processing component 430 may use transition probabilities of the tags in determining the sequence of tags from the sequence of score vectors. FIG. 3E illustrates an example tag transition probability matrix that may be used by sequence processing component 430.

A tag transition probability matrix may indicate the probability of a next tag given a current tag. The tag transition probability matrix may have rows and columns for the possible tags and also rows and columns corresponding to the beginning and end of the sequence of tags. For example, to start a sequence of tags, that transition probability matrix may have a row for the probabilities that the first token corresponds to each of the tags as indicated by the first row of FIG. 3E which is labelled with S for "start". In the first row, the first value is 0 because there cannot be more than one start token, the second value is the probability that the first token is a person (P), the third value is the probability that the first token is an organization (G), and so forth. That last value for "end" E may be 0 if an empty sequence of tokens is not allowed.

The second row for person (P) indicates the probabilities of the tag for the next token given that the current token is a person. The third row for organization (G) indicates the probabilities of the tag for the next token given that the current token is an organization.

Many variations are possible for transition probabilities. For example, the first column for S or the last row for E may be omitted. The transition matrix may be transposed. In some implementations, the transition probabilities may be modelled differently, such as with n-grams, a finite state machine, or a finite state transducer.

The transition probabilities may be determined using any appropriate techniques. In some implementations, the transition probabilities may be computed from the same training data that was used to train classifier component 420. For example, transition probabilities may be computed by counting the number of instances of each transition and then dividing by the total number of instances of the first tag of the transition. For another example, transition probabilities may be computed or learned using a conditional random field. In some implementations, a model for the transition probabilities may be learned through a training process using the same training data that was used to train classifier component 420. For example, a finite state transducer may be trained using a forward-backward algorithm and/or an expectation maximization algorithm.

Entity assignment component 440 may then assign entities to tokens or sequences of tokens using the tags. For example, for the example of FIG. 3C, a sequence of tokens having the same tag may be combined to create an entity, such as combining the tokens "Larry" and "Bird" to create the person entity "Larry Bird". Entity assignment component 440 may output labelled text that indicates the entities present in the input text.

Returning to classifier component 420, a classifier of an existing NER system may include one or more neural network layers. The final layers may be one or more output layers that output classification scores or probabilities. The combination of the layers prior to the one or more output layers may be described as computing a token embedding vector that represents a token in a vector space.

Figure 4B:
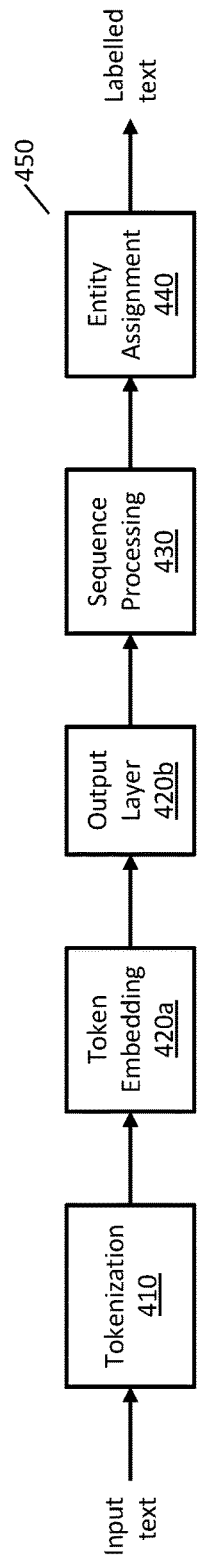

FIG. 4B is an example NER system 450 that modifies NER system 400 of FIG. 4A. In FIG. 4B, classifier component 420 has been split into two components, token embedding component 420a and output layer component 420b.

In some implementations, where classifier component 420 is a neural network, token embedding component 420*a* may include all neural network layers of classifier component 420 except for a final output layer, and output layer component 420*b* may include the final neural network layer of classifier component 420. Token embedding component 420*a* may process a sequence of tokens and generate a sequence of token embeddings. Output layer component 420*b* may then process the sequence of token embeddings to compute a score vector for each token embedding.

A token embedding is a representation of a token in a vector space such that the token embedding includes relevant information about the token. For example, in some implementations, a token embedding may preserve information about the meaning of the token. Two tokens that have similar meanings may have token embeddings that are close to each other in the vector space. By contrast, two tokens that do not have similar meanings may have token embeddings that are not close to each other in the vector space.

Figure 6:
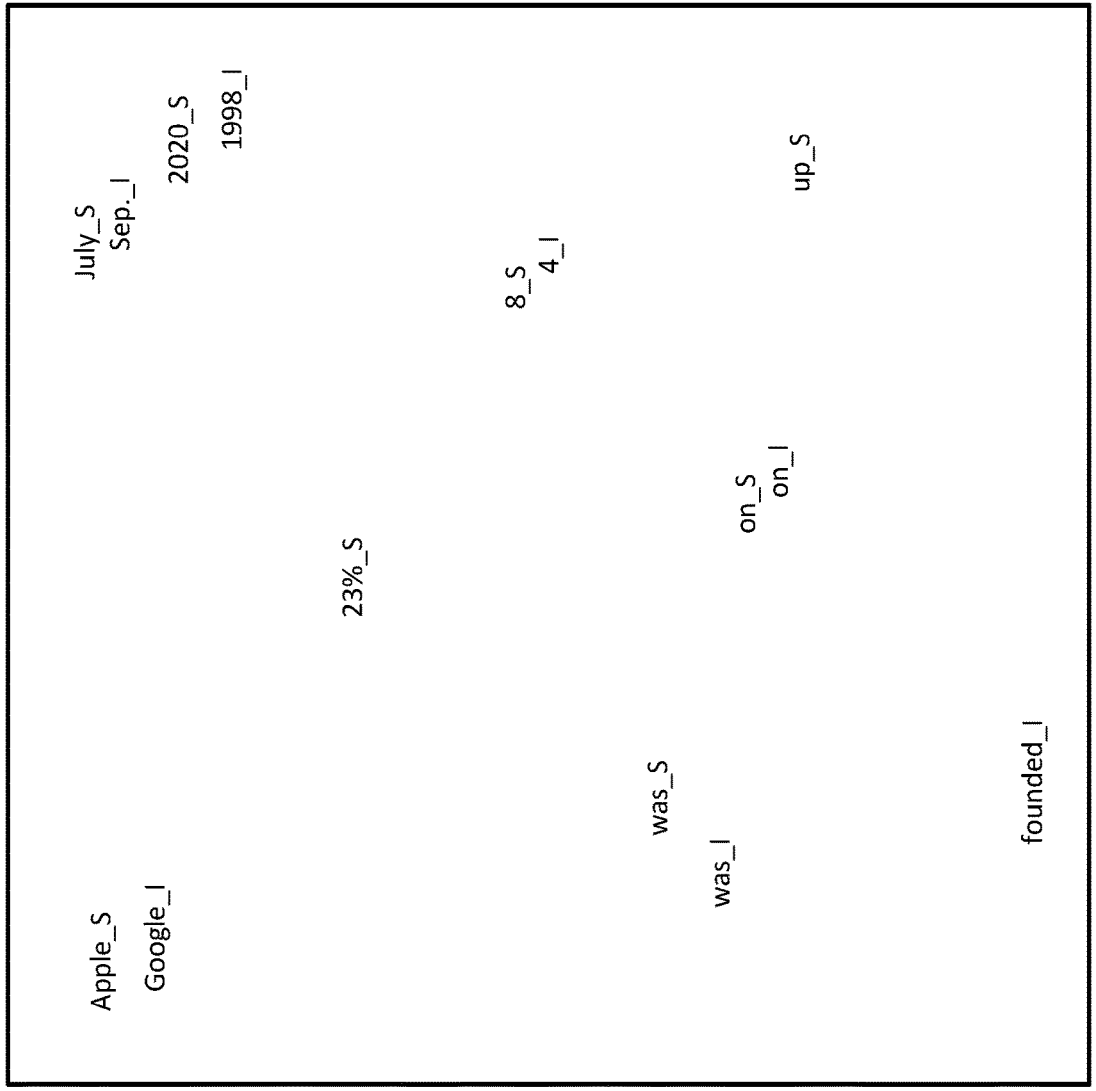
FIG. 6 illustrates a conceptual representation of token embeddings in a vector space.

FIG. 6 illustrates a conceptual representation of token embeddings in a vector space. In the example of FIG. 6, for clarity of presentation, the token embeddings are shown in a two-dimensional vector space, but token embeddings may use larger vector spaces, such as a 128-dimensional vector space or a 512-dimensional vector space. In the example of FIG. 6, token embeddings are shown for the support text of FIG. 2 where "_S" has been appended to indicate that the tokens are from the support text, and token embeddings are shown for the input text of FIG. 2 where "_I" has been appended to indicate that the tokens are from the input text.

The token embeddings for the support text and the input text may be computed using the same token embedding techniques. Accordingly, where an input token and a support token have similar meanings or other similar aspects, the corresponding token embeddings are more likely to be close to each other in the vector space. For example, the token embeddings of "Apple" and "Google" may be close to each other because they are both companies. For another example, the token embeddings of "July" and "September" may be close to each other because they both correspond to dates.

In some implementations, the token embeddings may not be contextual. Where token embeddings are not contextual, a token may have the same token embedding regardless of the tokens that come before or after the token. Non-contextual token embeddings may be computed using any appropriate techniques, such as GloVe and word2vec.

In some implementations, token embeddings may be contextual. Where token embeddings are contextual, the token embedding of a token may depend on previous or subsequent tokens. For example, the token "bank" in the phrases "river bank" and "bank deposit" may have different values according to the two very different meanings of "bank." Contextual token embeddings may be computed using any appropriate neural network, such as an LSTM neural network or a BERT neural network.

In some implementations, other divisions of classifier component 420 are possible. For example, where classifier component 420 is implemented using techniques other than a neural network, then classifier component 420 may be split into a first part and a second part instead of into token embedding component 420*a* and output layer component 420*b*. In some implementations, where classifier component 420 is implemented using a neural network, the first part may be any number of initial neural network layers and the second part may be any number of final neural network layers (such as the last two layers). In some implementations, the first part and the second part need not include all the neural network layers of classifier component 420 and some layers may be omitted.

Figure 5:
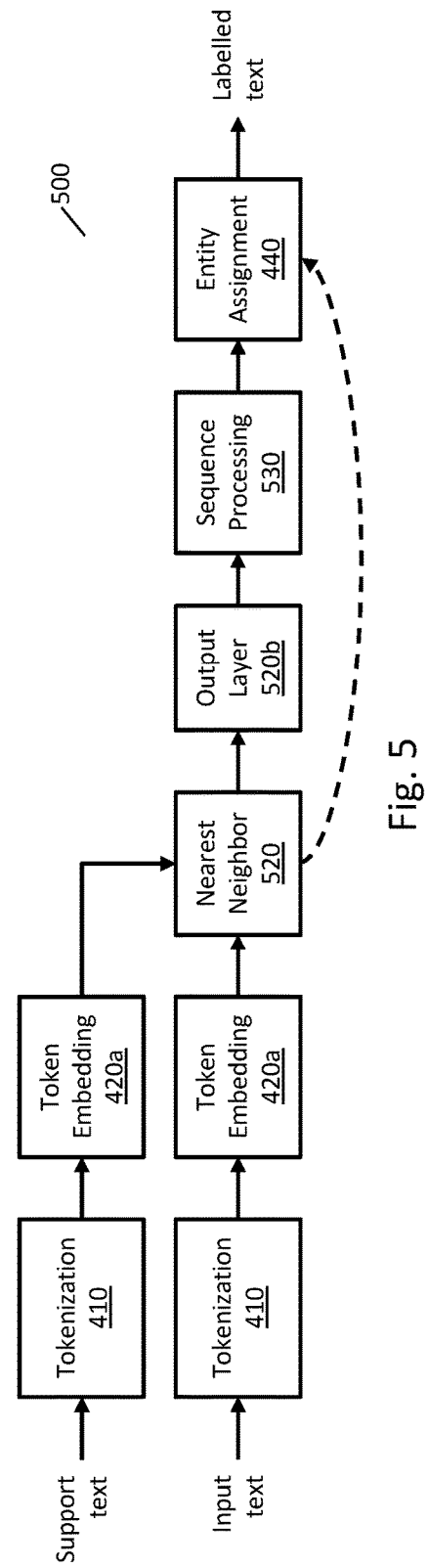
FIG. 5 is an example system for adapting an existing NER system to recognize one or more new named entities using few-shot learning.

FIG. 5 is an example system 500 that may be used to adapt an existing NER system to recognize one or more new named entities using few-shot learning. For example, system 500 may adapt an existing NER system that recognizes person, organization, and location entities to create a new NER system that recognizes company, number, and date entities.

In FIG. 5, the inputs to system 500 includes support text and input text. The support text may include, for example, one or more sentences that provide labelled examples of the one or more new named entities. The support text may include any appropriate number of examples of each new named entity, such as one example of each new named entity, a few examples of each new named entity, or many examples of each new named entity. The input text may include any text that may be input to a production NER system.

The support text may be tokenized by tokenization component 410 to generate a support sequence of tokens. Where the support text comprises one or more sentences, the support text may be tokenized to generate one or more support sequences of tokens. Any appropriate tokenization techniques may be used.

The support sequence of tokens may then be processed by token embedding component 420*a* to generate a sequence of support token embeddings. Token embedding component 420*a* may be obtained from a classifier of an existing NER system, such as classifier component 420 of FIG. 4A. Token embedding component 420*a* may include any appropriate portion of a classifier of an existing NER system. In some implementations, where the classifier of the existing NER system is a neural network, token embedding component 420*a* may include a number of initial layers of the neural network, such as all layers of the neural network classifier except one or more output layers.

The sequence of support token embeddings may then be used to recognize entities in the input text as described in greater detail below. In some implementations, the sequence of support token embeddings may be computed in advance and reused for each instance of input text.

The input text may also be processed by tokenization component 410 to generate a sequence of input tokens. The sequence of input tokens may then be processed by token embedding component 420*a* to generate an sequence of input token embeddings. Because the sequence of input token embeddings and the sequence of support token embeddings are computed using the same techniques, the token embeddings may be compared with each other.

Nearest neighbor component 520 may receive the sequence of input token embeddings and the sequence of support token embeddings and compute distances between input token embeddings and support token embeddings. A distance between a first input token embedding and each of the support token embeddings may be indicative of whether the first token corresponds to one of the new named entities or to none of the new named entities. For example, where the first token is closest to a company token in the support tokens, then it may be likely that the first token corresponds to a company entity. For another example, where the first token is closest to an other token in the support tokens, then it may be likely that the first token doesn't correspond to any of the new named entities. Nearest neighbor component 520 may use any appropriate techniques to compute distances between input token embeddings and support token embeddings.

In some implementations, nearest neighbor component 520 may, for each input token, determine which support token is closest to the input token. For example, let x denote an input token and x̂ denote the input token embedding for the input token. Let $s_i$ for i from 1 to N denote the support tokens with the corresponding support token embeddings denoted as $ŝ_i$. The support token closest to the input token x may be denoted as s* and determined as:

$$s^* = \underset{s_i}{\arg\min} \, d(ŝ_i, x̂)$$

where d is a distance function or other function that computes a similarity between two inputs. For example, d may compute a Euclidean distance or a cosine similarity between the two token embeddings. In some implementations, other processing may be performed, such as normalizing the token embeddings with an L2 normalization.

In some implementations, the input token x may then be tagged as corresponding to the new entity of the label of s*. For example, where s* is labelled as a person entity then x may be tagged as corresponding to a person entity. Where s* is labelled as an other entity then x may be tagged as an other entity.

Where nearest neighbor component 520 tags each token as corresponding to a new entity, then the output of nearest neighbor component 520 may be processed by entity assignment component 440 as indicated by the dashed line in FIG. 5.

In some implementations, nearest neighbor component 520 may, for each input token, compute a distance between the input token and the closest support token for each of the new entities. Let C denote the number of new entities (including an other entity). For the example of FIG. 2, C would be 4 (for company, number, date, and other). Let $S_c$ denote the set of support tokens corresponding to entity c for c from 1 to C. The distance between an input token x and new entity c may be computed as $$d_c(x) = \min_{ŝ \in S_c} d(ŝ, x̂)$$

where d is a distance or similarity function as above. Nearest neighbor component 520 may output a distance vector for each input token where the distance vector includes the distances from the token to each of the new entities.

Where nearest neighbor component 520 outputs distance vectors, the distance vectors may be processed by output layer component 520b as indicated by the solid line.

Output layer component 520b may process the distance vectors for the input tokens to compute a nearest neighbor score vector for each of the input tokens. The processing of output layer component 520b need not be the same as the processing of output layer component 420b.

A nearest neighbor score vector may be any appropriate score vector, such as vector of probabilities or likelihoods. A nearest neighbor score vector may have a nearest neighbor score for each of the new entities. In some implementations, a nearest neighbor score, $z_c$, for input token x and new entity c may be computed using a softmax function:

$$z_c = \frac{e^{-d_c(x)}}{\sum_{c'=1}^{C} e^{-d_{c'}(x)}}$$

The nearest neighbor score vector, Z, may then be determined by combining the scores for each of the new entities:

$$\begin{bmatrix} z_1 \\ \vdots \\ z_C \end{bmatrix}$$

The nearest neighbor score vectors may be used in a similar manner as the score vectors illustrated in FIG. 3B. The nearest neighbor score vectors, however, are computed in a different manner than the score vectors of FIG. 3B.

The score vectors of FIG. 3B were computed using a classifier that was trained using a training corpus of labelled entities that are the same as the entities for which the score vector is being used. To train such, a classifier, a large training corpus may be required, and considerable time and expense may be required to obtain such a training corpus.

The nearest neighbor score vectors are computed using a classifier of an existing NER system and examples of the new named entities in the support text. Accordingly, a large training corpus of examples of the new entities is not needed to compute the nearest neighbor score vectors.

Sequence processing component 530 may receive the nearest neighbor score vectors for the input tokens and assign a tag to each of the input tokens where the tag corresponds to one of the new named entities. Although sequence processing component 530 may provide similar functionality as sequence processing component 430, different techniques may be needed where tag transition probabilities for the new entities are not available, such as described below.

The tag transition probabilities of FIG. 3E were computed or trained using a large training corpus of example of named entities. For the new entities, a large training corpus with examples of the new entities may not be available. Instead, the available data may be a number of examples of each of the new entities in support text, and this data may not be sufficient for computing tag transition probabilities as described in FIG. 3E.

In some implementations, the training data for the existing NER system (and existing entities) may be used to obtain abstract tag transition probabilities that are not specific to any particular named entities and instead generally apply to any set of named entities.

Tag transition probabilities, such as the tag transition probabilities of FIG. 3E, may indicate the probability of transitioning between specific entity tags, such as transitioning from a person tag (P) to an organization tag (G). By contrast, an abstract tag transition probability may indicate the probability of transitions with referencing specific named entities.

The following are examples of abstract tag transitions: S>I (the first token corresponds to an entity tag (any tag except an other tag)); S>O (the first token corresponds to an other tag); I>O (a transition from any entity tag to an other tag); I>I (a transition from an entity tag to the same entity tag); I>IO (a transition from an entity tag to a different entity tag); I>E (the last token corresponds to an entity tag); O>E (the last token corresponds to an other tag); and IO>E (that last token corresponds to an entity tag that is different from the entity tag of the penultimate token). Other abstract tags are possible. For example, abstract tags may include a BIO tagging scheme or a BILOU tagging scheme.

In some implementations, an IO tag may only be used for the end of a transition, such as I>IO. For the next transition, the start of the transition may be indicated as I. For example, where there are three subsequent tokens that correspond to different named entities, the transition from the first token to the second token may be I>IO and the transition from the second token to the third token may also be I>IO.

Because the abstract tags do not correspond to any particular named entities, they may be computed from any training corpus that includes labelled examples of named entities. For example, abstract tag transition probabilities may be computed from training data for a first NER system with a first set of named entities. These abstract tag transition probabilities may then be used with a second NER system that recognizes a different set of named entities.

FIG. 7 indicates the example of the training text of FIG. 1, where the training text has been annotated with abstract tag transitions. The first transition is S>I since the first tag is an entity tag. The second transition is I>I since the second tag is the same entity tag as the first tag. The third transition is I>O since the third tag is an entity tag and the fourth tag is an other tag, and so forth.

FIG. 8 is an example of abstract tag transition probability matrix that may be computed from training data for an NER system. Each probability may be the probability of transitioning from the abstract tag indicated by the row to the abstract tag indicated by the column (or vice versa). In some implementations where IO is only used for the end of a transition, the rows for I and IO may be merged. In some implementations, abstract tag transition probabilities may be represented using other techniques such as a finite state transducer. Abstract tag transition probabilities may be computed or trained using any of the techniques described above for the tag transition probabilities.

Accordingly, sequence processing component 530 may process the nearest neighbor score vectors for the input tokens and assign a tag to each of the input tokens using abstract tag transition probabilities. Sequence processing component 530 may be implemented using any appropriate techniques.

In some implementations, sequence processing component 530 may be implemented using emission and transition probabilities as follows:

$$Y^* = \arg\max_Y \prod_{t=1}^{T} p(y_t | \hat{x}_t) \times p(y_t | y_{t-1})$$

where Y indicates all possible sequences of tags, T is the number of tokens in the sequence, $p(y_t|\hat{x}_t)$ indicates the nearest neighbor score for the $t^{th}$ token embedding, and $p(y_t|y_{t-1})$ indicates an abstract tag transition probability for the $(t-1)^{th}$ token to the $t^{th}$ token. Any appropriate techniques may be used to determine the sequence of tags Y*. For example, Viterbi decoding may be applied with a temperature parameter to renormalize the abstract tag transition probabilities to the same scale as the nearest neighbor score vectors.

Entity assignment component 440 may receive a sequence of tags from either nearest neighbor component 520 or sequence processing component 530 to assign entities to tokens or sequences of tokens using the tags. Entity assignment component 440 may use any of the techniques described herein to determine entities in the input text from the sequence of tags. Entity assignment component 440 may output labelled text that indicates the entities present in the input text.

The entities recognized in the input text by system 500 may then be used for any appropriate application of NER. For example, the recognized named entities may be used for information extraction, question answering, machine translation, summarization, dialogue systems, knowledge base creation, or semantic annotation.

Figure 9:
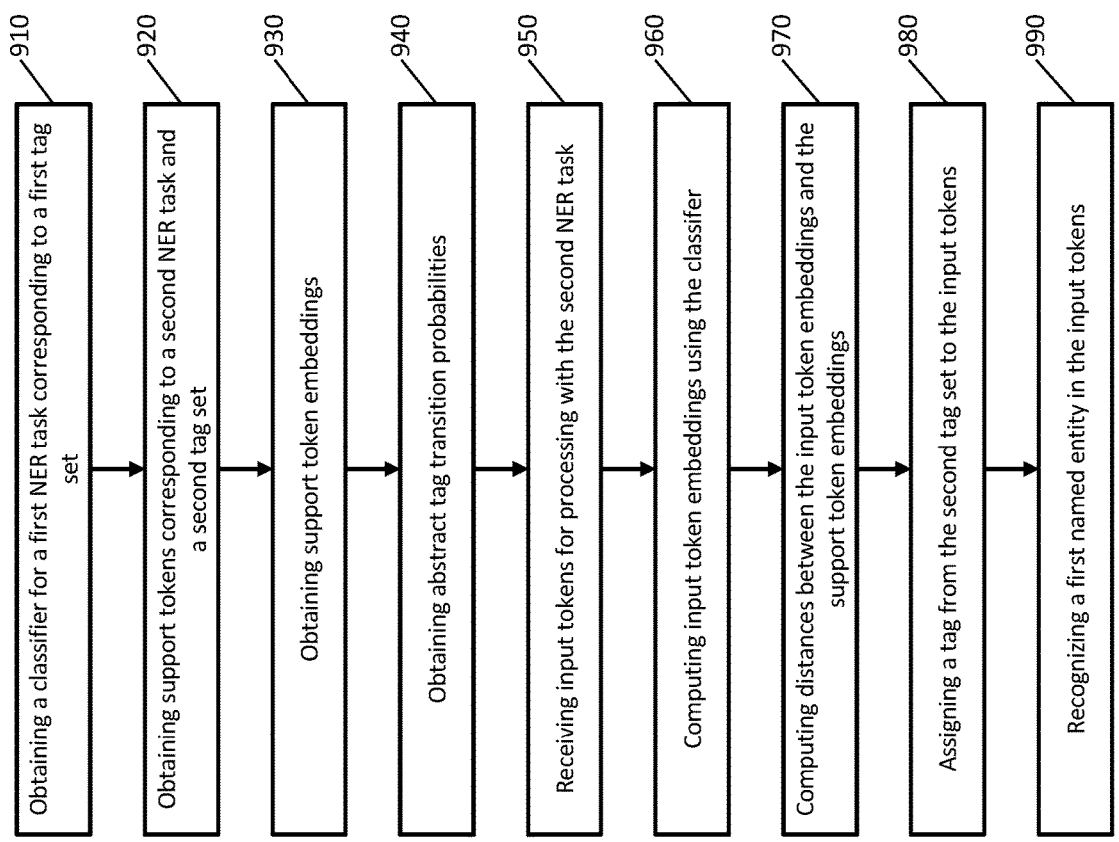
FIG. 9 is a flowchart of an example method for adapting an existing NER system to recognize one or more new named entities using few-shot learning.

FIG. 9 is a flowchart of an example method for adapting an existing NER system to recognize one or more new named entities using few-shot learning.

At step 910, a classifier for a first NER task is obtained where the first NER task corresponds to a first tag set. The first NER task may be any appropriate NER task and the first tag set may include any appropriate tags, such as any of the tags described herein. In some implementations, there may be a one-to-one correspondence between tags in the first tag set and named entities recognized by the first NER task (including an "other" tag that may be assigned to tokens that do not correspond to any named entity).

Any appropriate classifier may be obtained, such as a neural network classifier. In some implementations, the classifier may comprise one or more neural network layers corresponding to an LSTM neural network or a BERT neural network. The classifier may have one or more final output layers, such as a softmax layer.

An NER task may be any implementation of an NER system that recognizes a specified set of named entities. For example, a first NER task may be configured to recognize a first set of named entities and a second NER task may be configured to recognize a second set named entitles that may be different from the first set of named entities. The first and second sets of named entities may have some entities in common or may have non-overlapping sets of named entities.

At step 920, support tokens are obtained that correspond to a second NER task and a second tag set. The second tag set includes at least one tag that is not present in the first tag set. The second NER task may be any appropriate NER task and the second tag set may include any appropriate tags, such as any of the tags described herein. In some implementations, there may be a one-to-one correspondence between tags in the second tag set and named entities recognized by the second NER task (including an "other" tag that may be assigned to tokens that do not correspond to any named entity). The support tokens may be obtained from support text using any appropriate techniques, such as any of the tokenization techniques described herein.

The support tokens may be in any appropriate format. For example, the support tokens may be a sequence of support tokens corresponding to text, such as a sentence. For another example, the support tokens may be multiple sequences of support tokens corresponding to text, such as multiple sentences.

One or more of the support tokens may be labelled with a tag from the second tag set. In some implementations, each of the support tokens may be labelled with a tag from the second tag set (including an other tag for tokens that do not correspond to a named entity).

At step 930, support token embeddings are obtained for the support tokens. The support token embeddings may be computed from the support tokens using the classifier for the first NER task. As used herein, computing token embeddings from tokens using the classifier for the first NER task comprises using only a portion of the classifier for the first NER task (e.g., not performing processing corresponding to one or more output layers of the classifier). In some implementations, the support token embeddings may be obtained by processing the support tokens with the classifier and using an intermediate computation of the classifier as the support token embeddings. For example, where the classifier is a neural network, the classifier may sequentially process the support tokens, and at each iteration of processing a support token, the output of a penultimate layer of the classifier (e.g., the output of a layer before a final softmax layer) may be used as a support token embedding. The support token embeddings may be computing in advance and reused and this computation may not need to performed each time that the method is performed.

At step 940, abstract tag transition probabilities are obtained. Step 940 may be performed by obtaining previously computed probabilities (e.g., a matrix of abstract tag transition probabilities) or by obtaining a model that computes abstract tag transition probabilities (e.g., a finite state transducer). As used herein, an abstract tag transition probability relates to one or more of: (i) a transition between a tag that does not correspond to named entity (e.g., an other tag) to a tag that does correspond to a named entity; (ii) a transition between a tag that does correspond to named entity to a tag that does not correspond to a named entity; or (iii) a transition between a tag that corresponds to a named entity to a tag that corresponds to a different named entity. Other variations are possible, such as any of the variations described herein.

At step 950, input tokens are obtained for processing with the second NER task. The input tokens may be obtained from any appropriate text, and the input tokens may be obtained from the text using any appropriate techniques, such as any of the tokenization techniques described herein. The input tokens may be in any appropriate format. For example, the input tokens may be a sequence of input tokens corresponding to text, such as a sentence.

At step 960, input token embeddings are computed from the input tokens using the classifier for the first NER task. The input token embeddings may be computed from input tokens in a similar manner as to how the support token embeddings are computed from the support tokens.

At step 970, distances are computed between input token embeddings and support token embeddings. In some implementations, a distance may be computed between each input token embedding and each support token embedding. As used herein, a distance includes other manners of computing similarity scores between two vectors, such as a cosine similarity. Any appropriate techniques may be used to compute the distances, such as any of the techniques described herein.

At step 980, one or more tags from the second tag set are assigned to one or more of the input tokens using the distances from step 970 and/or the abstract tag transition probabilities from step 940. The tags may be assigned using any appropriate techniques, such as any of the techniques described herein.

In some implementations, a first tag from the second tag set may be assigned to a first input token using distances between a first input token embedding (corresponding to the first input token) and the support token embeddings. A closest support token may be selected, and the first tag that is assigned to the first token may be determined from the tag of the closest support token.

In some implementations, a nearest neighbor score vector may be computed for input tokens using the distances and using any of the techniques described herein. A tag may be assigned to the input tokens using the nearest neighbor score vectors and the abstract tag transition probabilities. For example, a sequence of nearest neighbor score vectors may be processed using a Viterbi decoder along with the abstract tag transition probabilities to determine a most likely tag from the second tag set for each input token.

At step 990, a first named entity is recognized in the input tokens using the assigned tags. Any appropriate techniques may be used to recognize the named entity. In some implementations, a sequence of tokens with the same tag may be combined to form a recognized name entity. In some implementations, where a BIO or BILOU tagging scheme is used, sequences of tokens corresponding to the same named entity may be identified to form a recognized name entity. For example, a "beginning" tag may indicate the start of a named entity, a subsequent token with an "inside" tag may indicate that subsequent token is part of the same named entity, and a token with a "last" tag may indicate the end of the named entity. The recognized named entity may then be used for any appropriate application of NER, such as any of the applications described herein.

It can be seen that the implementations set forth throughout the present disclosure provide technical improvements for rapid and reliable recognition of new named entities. New named entities may be recognized in input text without requiring new training data, and/or models. Instead, supporting text, that includes new named entities, may be processed using existing models to determine scores for identifying new named entities in input text. The implementations set forth throughout the present disclosure do not require a large training corpus of examples of new named entities. Instead, a small number of examples of each of the new entities in support text may be sufficient to determine new named entities in input text. Fast and efficient operations on the support text are sufficient to extract relationships between new named entities and other named entities of the trained model. Operations such as determining embeddings of the support text tokens using previously trained models, determining distances between embeddings of tokens of the support text and input text, and determining nearest neighbor score vectors to determine associated tags for a new named entity may be used to identify new named entities using previously defined NER models and brief support text.

Figure 10:
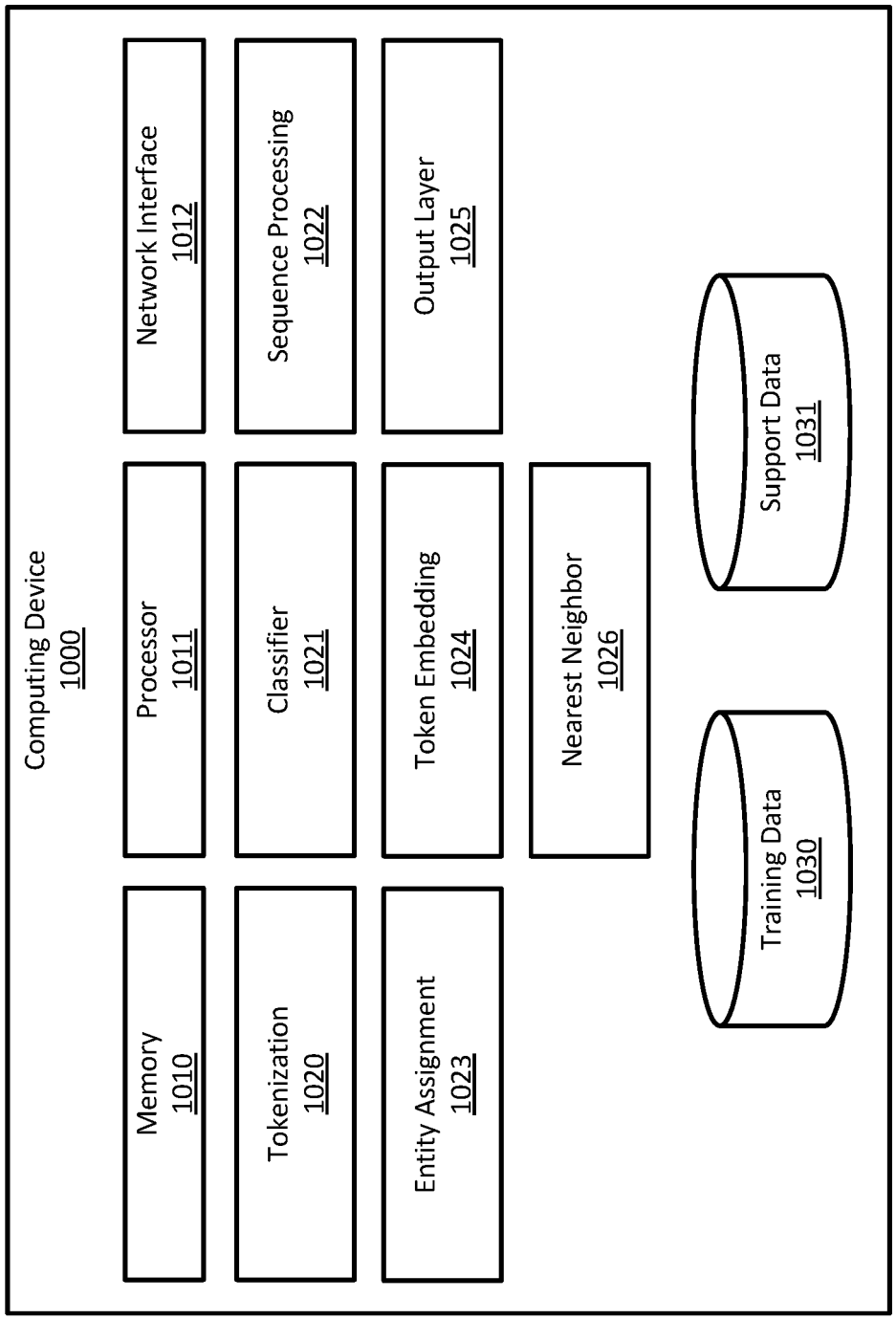
FIG. 10 illustrates components of an example computing device for adapting an existing NER system to recognize one or more new named entities using few-shot learning.

FIG. 10 illustrates components of one implementation of a computing device 1000 for implementing any of the techniques described herein. In FIG. 10, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1000 may include any components typical of a computing device, such as volatile or nonvolatile memory 1010, one or more processors 1011, and one or more network interfaces 1012. Computing device 1000 may also include any input and output components, such as displays, keyboards, and touch screens. Computing device 1000 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 1000 may have a tokenization component 1020 that may process text to obtain tokens using any of the techniques described herein. Computing device 1000 may have a classifier component 1021 that may process tokens to assign tags or compute classification scores using any of the techniques described herein. Computing device 1000 may have a sequence model component 1022 that may process a sequence of score vectors or nearest neighbor score vectors to assign tags using any of the techniques described herein. Computing device 1000 may have an entity assignment component 1023 that may process a sequence of tags to recognize named entities using any of the techniques described herein. Computing device 1000 may have a token embedding component 1024 that may compute a token embedding vector for a token using any of the techniques described herein. Computing device 1000 may have an output layer component 1025 that may compute probabilities or likelihoods from a vector using any of the techniques described herein. Computing device 1000 may have a nearest neighbor component 1026 that may compute a nearest neighbor score vector using any of the techniques described herein.

Computing device 1000 may include or have access to various data stores. Data stores may use any known storage technology such as files, relational databases, non-relational databases, or any non-transitory computer-readable media. Computing device 1000 may have a training data store 1030 that stores training data that may be used to train one or more of a classifier, a token embedding component, or abstract tag transition probabilities. Computing device 1000 may have a support data store 1031 that stores support text or tokens that may be used to implement an NER system with few-shot learning.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method for recognizing named entities, comprising:
   obtaining a classifier for a first named entity recognition task corresponding to a first tag set, wherein the classifier processes tokens to compute score vectors for the tokens;
   obtaining support tokens corresponding to a second named entity recognition task, wherein the support tokens are labelled with a tag from a second tag set, and wherein the second tag set comprises a first tag that is not in the first tag set;
   obtaining support token embeddings, wherein the support token embeddings were computed by processing the support tokens with the classifier for the first named entity recognition task;
   obtaining abstract tag transition probabilities, wherein the abstract tag transition probabilities comprise (i) a transition between a tag that does not correspond to any named entity to a tag that corresponds to any named entity, (ii) a transition between a tag that corresponds to any named entity to a tag that does not correspond to any named entity, and (iii) a transition between a tag that corresponds to any named entity to a tag that corresponds to a different named entity;
   receiving input tokens for processing with the second named entity recognition task;
   computing input token embeddings by processing the input tokens with the classifier for the first named entity recognition task;
   computing distances between the input token embeddings and the support token embeddings;
   assigning the first tag from the second tag set to a first input token using the distances and the abstract tag transition probabilities; and
   recognizing a first named entity in the input tokens, wherein the first named entity corresponds to the first tag.

2. The computer-implemented method of claim 1, wherein the classifier comprises layers that compute a token embedding and one or more output layers.

3. The computer-implemented method of claim 1, wherein the first tag set and the second tag set have at least one tag in common.

4. The computer-implemented method of claim 1, wherein the support tokens comprise one example of each tag in the second tag set.

5. The computer-implemented method of claim 1, wherein the support token embeddings are computed using a value of the classifier prior to one or more output layers.

6. The computer-implemented method of claim 1, wherein assigning the first tag from the second tag set to the first input token comprises computing nearest neighbor score vector indicating a match between the first input token and each tag in the second tag set.

7. The computer-implemented method of claim 6, wherein assigning the first tag from the second tag set to the first input token comprises processing the nearest neighbor scores and the abstract tag transition probabilities with a Viterbi decoder.

8. A system, comprising:
   at least one server computer comprising at least one processor and at least one memory, the at least one server computer configured to:
      obtain a classifier for a first named entity recognition task corresponding to a first tag set, wherein the classifier processes tokens to compute score vectors for the tokens;
      obtain support tokens corresponding to a second named entity recognition task, wherein the support tokens are labelled with a tag from a second tag set, and wherein the second tag set comprises a first tag that is not in the first tag set;
      obtain support token embeddings, wherein the support token embeddings were computed by processing the support tokens with the classifier for the first named entity recognition task;
      obtain abstract tag transition probabilities, wherein the abstract tag transition probabilities comprise (i) a transition between a tag that does not correspond to any named entity to a tag that corresponds to any named entity, (ii) a transition between a tag that corresponds to any named entity to a tag that does not correspond to any named entity, and (iii) a transition between a tag that corresponds to any named entity to a tag that corresponds to a different named entity;
      receive input tokens for processing with the second named entity recognition task;
      compute input token embeddings by processing the input tokens with the classifier for the first named entity recognition task;
      compute distances between the input token embeddings and the support token embeddings;

assign the first tag from the second tag set to a first input token using the distances and the abstract tag transition probabilities; and recognize a first named entity in the input tokens, wherein the first named entity corresponds to the first tag.

9. The system of claim 8, wherein the at least one server computer is configured to compute the input token embeddings using a value of the classifier prior to one or more output layers.

10. The system of claim 8, wherein the at least one server computer is configured to assign the first tag from the second tag set to the first input token by computing nearest neighbor scores indicating a match between the first input token and each tag in the second tag set.

11. The system of claim 10, wherein the nearest neighbor scores for the first input token are computed using distances between a first token embedding corresponding to the first input token and a nearest support token embedding from the support token embeddings for each tag of the second tag set.

12. The system of claim 10, wherein the at least one server computer is configured to assign the first tag from the second tag set to the first input token by processing the nearest neighbor scores with a Viterbi decoder.

13. The system of claim 8, wherein the classifier comprises a long short-term memory neural network or a bidirectional encoder representations from transformers neural network.

14. One or more non-transitory, computer-readable media comprising computer-executable instructions that, when executed, cause at least one processor to perform actions comprising:

obtaining a classifier for a first named entity recognition task corresponding to a first tag set, wherein the classifier processes tokens to compute score vectors for the tokens;

obtaining support tokens corresponding to a second named entity recognition task, wherein the support tokens are labelled with a tag from a second tag set, and wherein the second tag set comprises a first tag that is not in the first tag set;

obtaining support token embeddings, wherein the support token embeddings were computed by processing the support tokens with the classifier for the first named entity recognition task;

obtaining abstract tag transition probabilities, wherein the abstract tag transition probabilities comprise (i) a transition between a tag that does not correspond to any named entity to a tag that corresponds to any named entity, (ii) a transition between a tag that corresponds to any named entity to a tag that does not correspond to any named entity, and (iii) a transition between a tag that corresponds to any named entity to a tag that corresponds to a different named entity;

receiving input tokens for processing with the second named entity recognition task;

computing input token embeddings by processing the input tokens with the classifier for the first named entity recognition task;

computing distances between the input token embeddings and the support token embeddings;

assigning the first tag from the second tag set to a first input token using the distances and the abstract tag transition probabilities; and recognizing a first named entity in the input tokens, wherein the first named entity corresponds to the first tag.

15. The one or more non-transitory, computer-readable media of claim 14, wherein assigning the first tag from the second tag set to a first input token comprises computing, for the first input token, nearest neighbor scores indicating a match between the first input token and each tag in the second tag set.

16. The one or more non-transitory, computer-readable media of claim 14, wherein the first named entity corresponds to a person, profession, location, organization, company, number, percentage, date, time, monetary value, phone number, email, zip code, address, product, service, color, medical code, disease, diagnosis, doctor, patient, or customer.

17. The one or more non-transitory, computer-readable media of claim 14, wherein the input tokens are word-piece encodings.

* * * * *